(12) United States Patent
Passmore

(10) Patent No.: US 8,643,641 B2
(45) Date of Patent: Feb. 4, 2014

(54) SYSTEM AND METHOD FOR PERIODIC BODY SCAN DIFFERENCING

(76) Inventor: Charles G. Passmore, San Diego, CA (US)

( * ) Notice: Subject to any disclaimer, the term of this patent is extended or adjusted under 35 U.S.C. 154(b) by 856 days.

(21) Appl. No.: 12/119,353

(22) Filed: May 12, 2008

(65) Prior Publication Data
US 2009/0281420 A1    Nov. 12, 2009

(51) Int. Cl.
G06T 15/00    (2011.01)
G09G 5/00    (2006.01)
G06K 9/00    (2006.01)

(52) U.S. Cl.
USPC .......................... 345/419; 345/646; 382/131

(58) Field of Classification Search
USPC ............... 345/419, 646; 382/131, 308; 378/4; 600/410
See application file for complete search history.

(56) References Cited

U.S. PATENT DOCUMENTS

| | | | |
|---|---|---|---|
| 6,072,496 A * | 6/2000 | Guenter et al. ............... | 345/419 |
| 6,363,169 B1 * | 3/2002 | Ritter et al. .................... | 382/154 |
| 6,377,700 B1 * | 4/2002 | Mack et al. .................... | 382/154 |
| 6,788,210 B1 * | 9/2004 | Huang et al. .................. | 340/612 |
| 7,456,842 B2 * | 11/2008 | Kosolapov .................... | 345/589 |
| 2003/0002052 A1 * | 1/2003 | Hoffmann ..................... | 356/603 |
| 2003/0013951 A1 * | 1/2003 | Stefanescu et al. ........... | 600/407 |
| 2003/0042401 A1 * | 3/2003 | Gartner et al. ............. | 250/208.1 |
| 2003/0160970 A1 * | 8/2003 | Basu et al. .................... | 356/601 |
| 2005/0018209 A1 * | 1/2005 | Lemelin et al. ............... | 356/604 |
| 2005/0143965 A1 * | 6/2005 | Failla et al. ........................ | 703/2 |
| 2005/0245803 A1 * | 11/2005 | Glenn, Jr. et al. ............. | 600/407 |
| 2006/0154198 A1 * | 7/2006 | Durbin et al. .................... | 433/29 |
| 2007/0014448 A1 * | 1/2007 | Wheeler et al. ............... | 382/128 |
| 2007/0019849 A1 * | 1/2007 | Kaufman et al. .............. | 382/128 |
| 2007/0081707 A1 * | 4/2007 | Sirohey et al. ................ | 382/128 |
| 2007/0085849 A1 * | 4/2007 | Kosolapov .................... | 345/419 |
| 2007/0229850 A1 * | 10/2007 | Herber .......................... | 356/604 |
| 2009/0226049 A1 * | 9/2009 | Debevec et al. .............. | 382/118 |
| 2009/0322745 A1 * | 12/2009 | Zhang et al. .................. | 345/420 |

OTHER PUBLICATIONS

Davies et al; A Hough Transform for Detecting the Location and Orientation of Three-Dimensional Surfaces Via Color Encoded Spots; Feb. 1998; IEEE Transactions on Systems, Man, and Cybernetics—Part B: Cybernetics; vol. 28; pp. 90-95.*
Morano et al.; Structure Light Using Pseudorandom Codes; Mar. 1998; IEEE Transactions on Pattern Analysis and Machine Intelligence; vol. 20, No. 3; pp. 322-327.*

(Continued)

*Primary Examiner* — David T Welch
(74) *Attorney, Agent, or Firm* — Arc IP Law, PC; Joseph J. Mayo

(57) ABSTRACT

System and method for periodic body scan differencing for detecting changes in surface and subsurface body scans over time. May include use of a scanner and a computer system configured to scan a portion of body at first point in time to yield first scan, scan the portion of the body at second point in time to yield second scan, difference the two scans to produce a morphological difference image, and display the morphological difference image. May utilize surface or subsurface scans. Any type of scanner may be utilized that scans to the desired resolution of morphological testing. Can morph scan(s), geometrically, visually or both, to account for age, weight or color differences that have occurred between scans. Can display morphological surface or subsurface differences between scans in multiple images or atlas view. Differences can be displayed independently or overlaid onto scan(s). Differences may be highlighted to make more readily viewable.

18 Claims, 13 Drawing Sheets

(56) References Cited

OTHER PUBLICATIONS

Salvi et al.; Pattern Codification Strategies in Structured Light Systems; 2004; University of Girona (Spain).*

Pages et al; A New Optimised De Bruijn Coding Strategy for Structured Light Patterns; University of Girona (Spain); 2004; IEEE Proceedings of the 17th International Conference on Pattern Recognition.*

* cited by examiner 1201   1202

SYSTEM AND METHOD FOR PERIODIC BODY SCAN DIFFERENCING

BACKGROUND OF THE INVENTION

1. Field of the Invention

Embodiments of the invention described herein pertain to the field of computer systems. More particularly, but not by way of limitation, one or more embodiments of the invention enable a system and method for periodic body scan differencing for detecting changes in surface and subsurface body scans over time.

2. Description of the Related Art

There are many types of methods for scanning a biological specimen, such as a body. Methods include introducing energy to a body and recording energy that transmits through a body or reflects back from a body. These methods are utilized for subsurface scanning and surface scanning. Generally, the methods are directed at diagnosing or investigating ailments or functions of a body. One type of scanning includes medical imaging. Medical imaging includes radiological, thermographic, photographic, microscopic and acoustic imaging. Within the medical imaging area, morphological tissue imaging is utilized to observe changes in tissues.

X-ray scanning may be utilized for both subsurface and surface scanning. Subsurface scanning using x-rays has been utilized for many years to scan the body for broken bones for example. X-rays may also be utilized for surface scanning, as in the case of backscatter scanning devices. Backscatter devices have been controversial in their proposed use for airport security due to the invasion of privacy, i.e., of a scanner capable of viewing through clothing for example.

Current efforts in early detection of diseases include whole body computed tomography (CT) scanning. CT scanning is also known as computerized axial tomography (CAT). The United States Food and Drug administration currently does not recommend whole body CT scanning as the radiation risks are thought to outweigh the remote possibility of detecting a disease early enough to cure the disease. The dose of x-rays received during a whole body CT scan is far greater than a typical chest x-ray. A CT scan of the stomach for example is generally equivalent to 500 chest x-rays or about the same amount of radiation received from the background in over 3 years. CT scans generally produce images of thin slices of a body. Imaging by slices is an example of a tomographic imaging solution. CT scans show good detail when imaging dense tissues and bones since this technique relies on the blocking of x-rays to generate an image.

Positron-emission tomography (PET) allows for the capability to detect gamma rays emitted from a positron-emitting isotope introduced into a body. Depending on the molecule introduced, different tissues of interest may be scanned. One common molecule utilized in PET is fluorodeoxyglucose (FDG) a type of sugar that accumulates in glucose-avid cells, including tumor cells for example. Generally tumors smaller than 5 mm are undetectable using PET scans. Hence, there are limitations with this type of technology with respect to morphological tissue imaging.

Magnetic resonance imaging (MRI) uses powerful electromagnets to excite hydrogen nuclei. MRI's usually create two-dimensional slices through a body. Unlike x-rays, MRI's do not use ionizing radiation and therefore do not have the same health issues. MRI's also have the advantage of showing good detail in soft tissues. MRI's have poor resolution with respect to morphological tissue imaging for small details.

Optical coherence tomography (OCT) on the other hand utilizes lower frequency electromagnetic radiation than x-rays, for example light from a laser. The frequency of radiation generally utilized is not high enough to damage DNA and as such, is much safer than x-rays. Generally, the item being scanned must allow for at least a small percentage of photons to travel through it. This technology allows for resolution on the order of a micron or less and is well suited for use in morphological tissue imaging.

Confocal microscopy is an improved version of convention microscopy that utilizes a point source for light and gathers an image from the focal plane of the microscope. This imaging technique lacks millimeter penetration depth and is not utilized in morphological tissue imaging.

Multispectral colposcopy is a technique for surface scanning tissue at multiple frequencies to better detect subtle changes or abnormalities, for example of the human cervix. This technique is an improvement over standard colposcopy as performed visually that is highly dependent on the physician's visual acuity and expertise.

Medical ultrasonography is another scanning technology for imaging a body. Medical sonography is also known as ultrasound. Ultrasound is commonly utilized to image a fetus in the womb during pregnancy for example. Ultrasound is so name since the frequency of energy utilized is above 20,000 Hertz, i.e., above the upper limit of human hearing. Generally, ultrasound scanners work in the Megahertz range, for example between 2 and 18 Megahertz. Ultrasound scans of lower frequency sound provide less resolution but penetrate deeper into the body while higher frequency scans provide more resolution yet do not penetrate as deep into the body. Ultrasound has poor resolution with respect to morphological tissue imaging.

Regardless of the technology utilized to generate a scan of a portion of a body, recurrence testing and morphological tissue imaging generally utilize a pair of side by side images that are visually compared by a doctor. The images include a first image taken at a previous doctor visit and a new image taken at the current doctor visit. The doctor looks at the images side by side to determine if there are new problems. This technique applies to surface and subsurface scans. Depending on the type of imaging technology and resulting images, many dangerous tissue changes go undetected based on the visual acuity of the particular doctor manually comparing the two images side by side. Hence, there is a need for an system and method for periodic body scan differencing that can detect subtle changes in the surface or subsurface of a body over time with a sensitivity greater than the current side by side comparison with the human eye in use today.

BRIEF SUMMARY OF THE INVENTION

One or more embodiments of the invention enable a system and method for periodic body scan differencing for detecting changes in surface and subsurface body scans over time. Embodiments may utilize a scanner and a computer system configured to scan a portion of body at first point in time to yield first scan, scan the portion of the body at second point in time to yield second scan, difference the two scans to produce a morphological difference image, and display the morphological difference image. A scan may include a series of images, for example a series of multispectral image captures of a portion of the body. In embodiments employing multispectral scans, any non-zero subset of images from a first scan may be utilized in any combination for comparison against any non-zero subset of images from a second scan for example.

Embodiments may utilize surface or subsurface scans for difference calculations. Any type of scanner employing any scanning technology may be utilized wherein the scanner scans to the desired resolution of morphological testing. For example, use of an optical coherence tomography scanner allows for surface or subsurface scans down to a centimeter or so into the body with extremely high resolution on the order of a micron. This type of scanner allows for detecting morphological changes in geometry or visual appearance or both. When a portion of the skin has changed in geometry, e.g., a mole has become larger, yet has not changed in color, the geometry differences displayed by embodiments of the invention enable detection of possible problems that a standard visual examination or side by side comparison of photographs would simply miss. Use of a multispectral scanner allows for differences in cell types to be more readily observed in certain applications. Embodiments of the invention allow for differences in subsurface PET scans to be differenced with display of morphological changes over time highlighted. This allows for more thorough PET scan analysis compare to side by side visual comparison by a doctor for example.

Embodiments of the invention may morph one or more scans, either geometrically, visually or both, to account for age, weight or color differences that have occurred between scans at two points in time. Hence, if a person weighs more or less, or has a tan for example, one or more of the scans may be morphed or normalized in any manner to better calculate more localized granularity of morphological changes. Embodiments may morph scans obtained from any scanner type using any type of scanning technology.

Embodiments may also display morphological surface or subsurface differences between scans in multiple images or atlas view. Atlas view allows for one image to display the entire portion of the body scanned and makes for more rapid observation of differences. The depth of the images or atlas view depends on the scanning technology employed for the particular application. Any type of projection may be utilized in transforming the scan for visual display. For example, Mercator, equirectangular, gnomonic or any other projection such as cylindrical, pseudocylindrical for example may be utilized to create the atlas view.

Differences can be displayed independently or overlaid onto scan(s). Differences may be highlighted to make more readily viewable. Differences may be displayed in colors other than the scanned color to indicate changes relative to the current scan versus a previous scan at a different point in time, e.g., a previous office visit for example.

Embodiments of the invention may also be utilized to detect morphological change rates, accelerations and any other derivative of change over time. This enables tissue areas that are changing faster than other areas or volumes to be highlighted, for example. In one scenario, a patient that has had skin cancer may be scanned every few months with moles that grow at a particular rate displayed in one color while moles that grow or accelerate growth at different rates or accelerations displayed in another color.

Regardless of the type of scanning technology utilized, embodiments of the invention radically improve the detection of morphological changes in a body over time.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

A system and method for periodic body scan differencing for detecting changes in surface and subsurface body scans over time will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
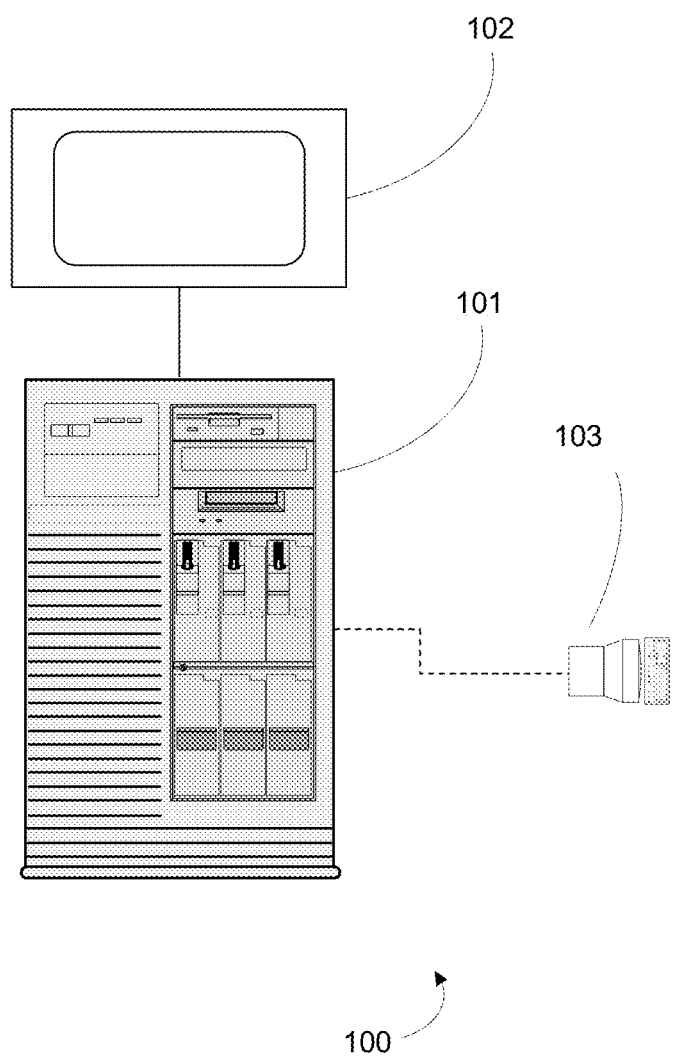
FIG. 1 is an architectural view of the system.

FIG. 1 is an architectural view of system 100. In this figure, computer 101 is coupled with associated display 102, either directly or indirectly over a computer network connection for example. Computer 101 is utilized to difference at least two scans obtained at different points in time from scanner 103. Scanner 103 may be directly coupled with or indirectly coupled with computer 101. Methods for coupling computer 101 and scanner 103 include use of computer communications networks, direct cable connections, indirectly transferring a digital scan to computer 101, for example via transfer of a removable storage device, such as a CD-ROM or any other method. Embodiments may utilize scanner 103 to scan a portion of body at first point in time to yield first scan, scan the portion of the body at second point in time to yield second scan, and utilize computer 101 to difference the two scans to produce a morphological difference image, and display the morphological difference image. A scan may include a series of images, for example a series of multispectral image captures of a portion of the body. In embodiments employing multispectral scans, any non-zero subset of images from a first scan may be utilized in any combination for comparison against or to difference any non-zero subset of images from a second scan for example.

Embodiments may utilize surface or subsurface scans for difference calculations. Any type of scanner 103 employing any scanning technology may be utilized wherein the scanner scans to the desired resolution of morphological testing. For example, use of an optical coherence tomography scanner allows for surface or subsurface scans down to a centimeter or so into the body with extremely high resolution on the order of a micron. This type of scanner allows for detecting morphological changes in geometry or visual appearance or both. When a portion of the skin has changed in geometry, e.g., a mole has become larger, yet has not changed in color, the geometry differences displayed by embodiments of the invention enable detection of possible problems that a standard visual examination or side by side comparison of photographs would simply miss. Use of a multispectral scanner allows for differences in cell types to be more readily observed in certain applications. Embodiments of the invention allow for differences in subsurface PET scans to be differenced with display of morphological changes over time highlighted. This allows for more thorough PET scan analysis compare to side by side visual comparison by a doctor for example. Any type of scanning technology may be utilized with embodiments of the invention, including those listed in the Brief Summary or any other type of scanning technology so long as at least one image taken at one point in time is compared against another at least one image taken at another point in time. The images may be two dimensional or projections of three dimensional images for example. Any two dimensional or three dimensional data may be compared and differenced without rendering an actual image on a screen in one or more embodiments of the invention.

Figure 2:
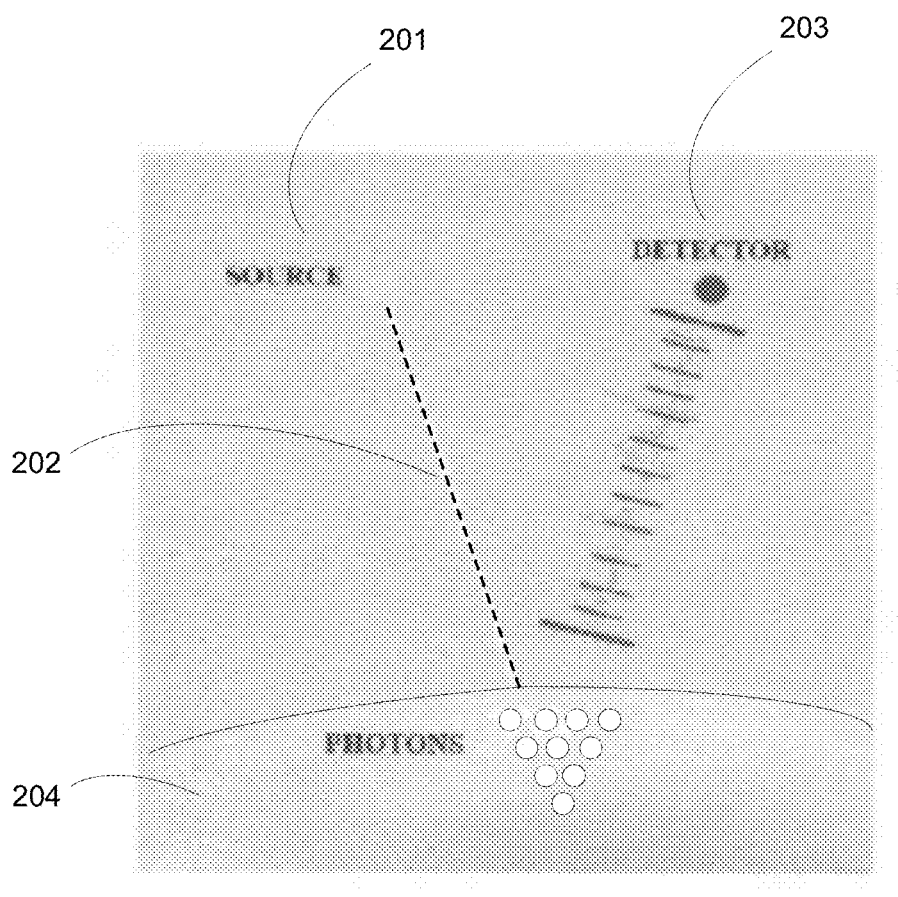
FIG. 2 illustrates an overview of photon based scanning.

FIG. 2 illustrates an overview of scanning. In this figure, source 201 emits energy 202 (in this example photons) that is detected by detector 203. Detector 203 may be collocated with source 201 or may reside in a different location. Detector 203 may obtain energy 202 that passes through body 204 or that reflects back from body 204 (as shown). Any type of source and detector may be utilized with embodiments of the invention in association with scanner 103.

Figure 3:
FIG. 3 shows a type of three-dimensional body scanning.

FIG. 3 shows a type of three-dimensional body scanning wherein person 301 is scanned for example with a laser that penetrates the skin. Person 301 may also be scanned through a broad range of frequencies, for example as with photographic capture of white light. The capture of visual surface data and depth data may be simultaneous or in successive scans. In this figure, person 301 is being scanned for morphological changes to the surface of the skin and to a depth of 1 cm with resolution of 1 micron.

Figure 4:
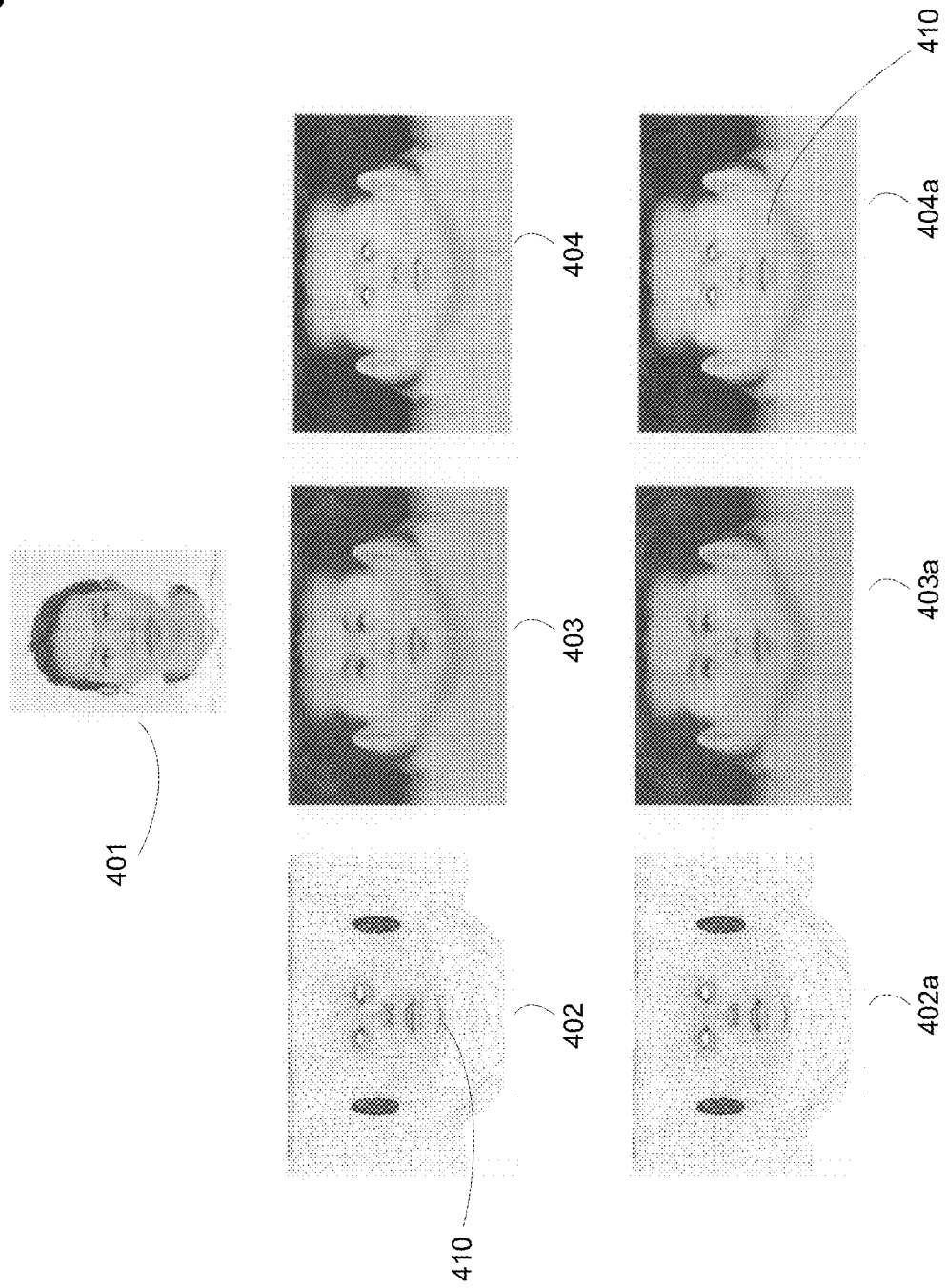
FIG. 4 shows a face of a person that is scanned in three dimensions and displayed in atlas views.

FIG. 4 shows a face of person 401 that is scanned in three dimensions and displayed in atlas views. Specifically, use of a high resolution laser scanner allows for the extraction of three-dimensional data. In this scenario, a simultaneous photograph is obtained. The three-dimensional data is projected using for example Mercator projection, to create geometry mesh 402. Any type of projection may be utilized in transforming the scan for visual display. For example, Mercator, equirectangular, gnomonic or any other projection such as cylindrical, pseudocylindrical for example may be utilized to create the atlas view. Gnomonic projection allows for the preservation of distance calculations. Conformal projections may be utilized for mole analysis. Different projections may be utilized to determine which projection type is best suited for a particular set of scans or desired analysis type.

The photograph is overlaid onto the mesh to create photometric atlas 403. Embodiments may display morphological surface or subsurface differences between scans in multiple images or atlas view as shown here for illustrative purposes. Atlas view allows for one image to display the entire portion of the body scanned and makes for more rapid observation of differences. The depth of the images or atlas view depends on the scanning technology employed for the particular application. Differences can be displayed independently or overlaid onto scan(s). Differences may be highlighted to make more readily viewable. Differences may be displayed in colors other than the scanned color to indicate changes relative to the current scan versus a previous scan at a different point in time, e.g., a previous office visit for example.

Figure 9:
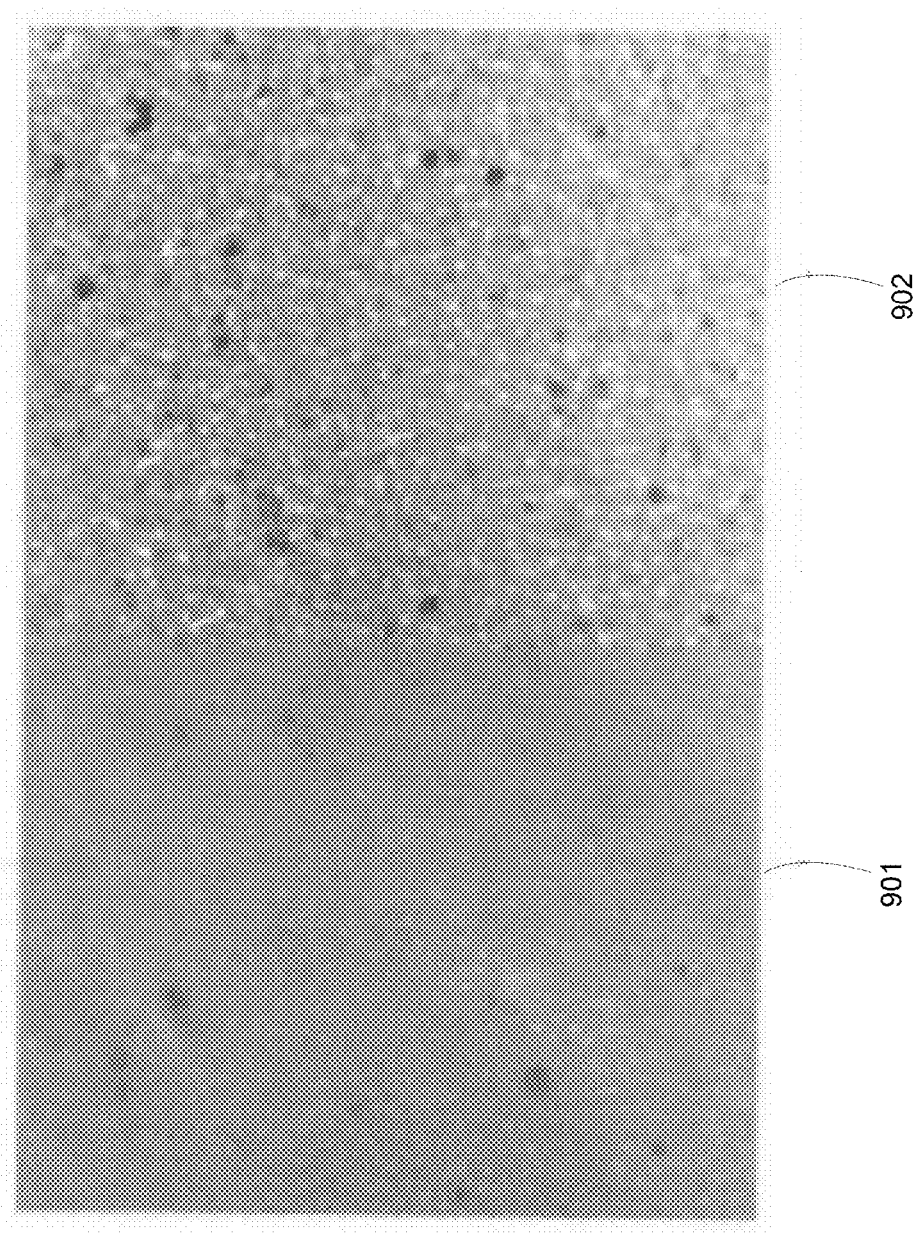
FIG. 9 shows an image of skin versus a sharpening filtered version of the same skin.
Figure 10:
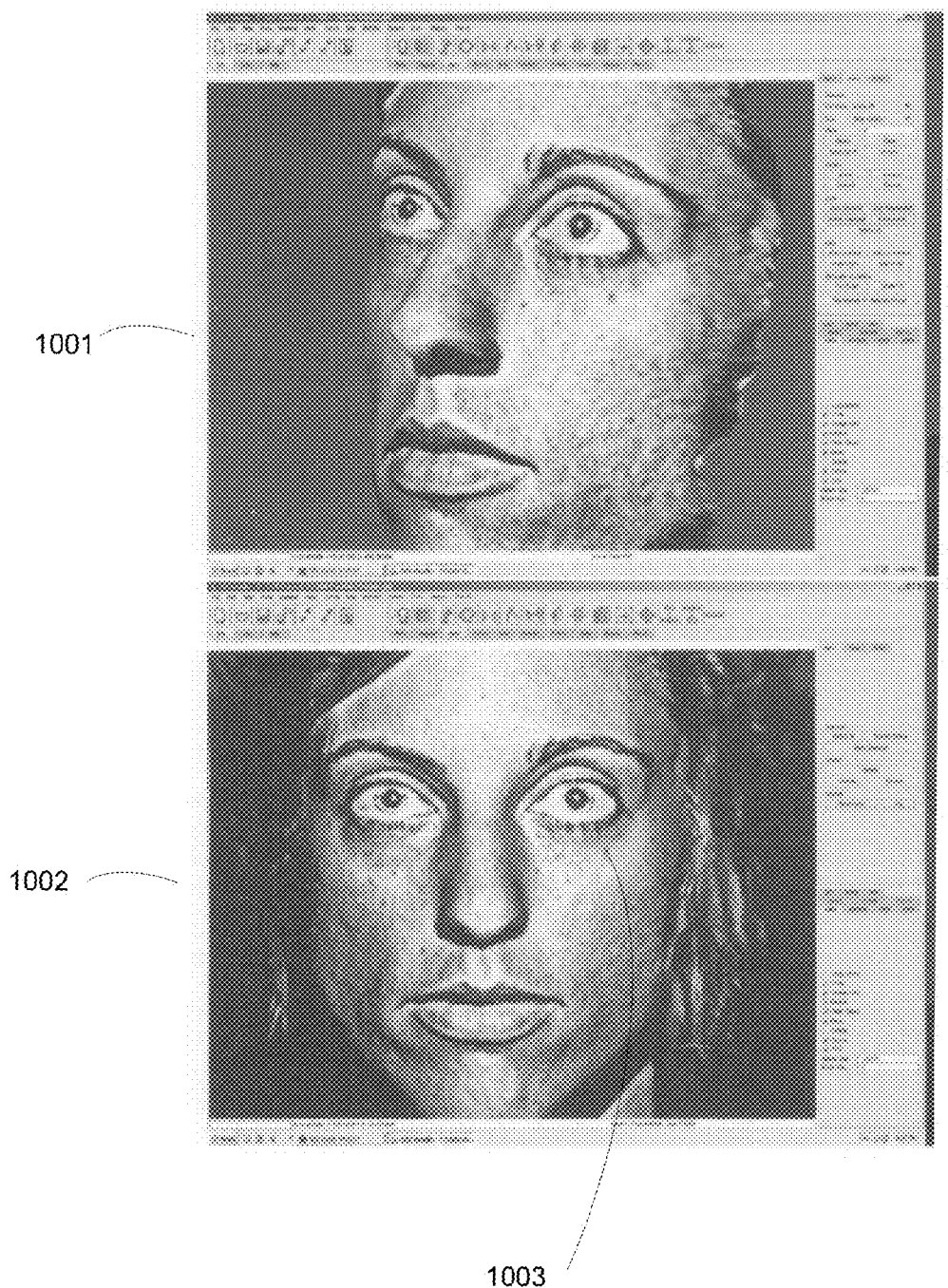
FIG. 10 shows two sharpening filtered versions of the person in FIG. 3 at different angles.

Any algorithm for highlighting differences in the scans may be utilized. In one or more embodiments of the invention a sharpening filter may be utilized. For example, an "unsharp" algorithm that subtracts a blurred version of an image from the image itself may be utilized to show differences. For example, FIG. 9 shows an image taken of a patient's skin 901 wherein an sharpened version of skin image 902 highlights several areas that are difficult to notice when the image is not enhanced. FIG. 10 likewise shows two "unsharp" images of person 301 as per FIG. 3. In these two images, angled image 1001 shows a side of the face of person 301 more directly, while straight-on image 1002 shows the front view of person 301 with sharpening filtering. Images 1001 and 1002 highlight several areas of possible morphological change such as freckle 1003.

With respect to FIG. 4, surface geometry atlas 404 is created by overlaying a grey-scale version of the photograph onto the geometry mesh, and enables comparison of non-color morphological change differences to be detected. In this scenario person 401 was scanned twice, once on first office visit and once during a second office visit three months later (shown as 402a). Any time period may be utilized for obtaining two scans, where three months is illustrative and non-limiting in the sense that any time period may be utilized depending on the desired purpose for the morphological change testing. Embodiments of the invention may morph one or more scans, either geometrically, visually or both, to account for age, weight or color differences that have occurred between scans at two points in time. Hence, if a person weighs more or less, or has a tan for example, one or more of the scans may be morphed or normalized in any manner to better calculate more localized granularity of morphological changes. As one skilled in the art will recognize, there are a multitude of software packages and algorithms for stretching images to fit a desired shape. Any type of morphing package, software module or system may be utilized in stretching or morphing images taken at different times to allow for morphological differences to be viewed while age, weight or color differences are minimized.

Figure 11:
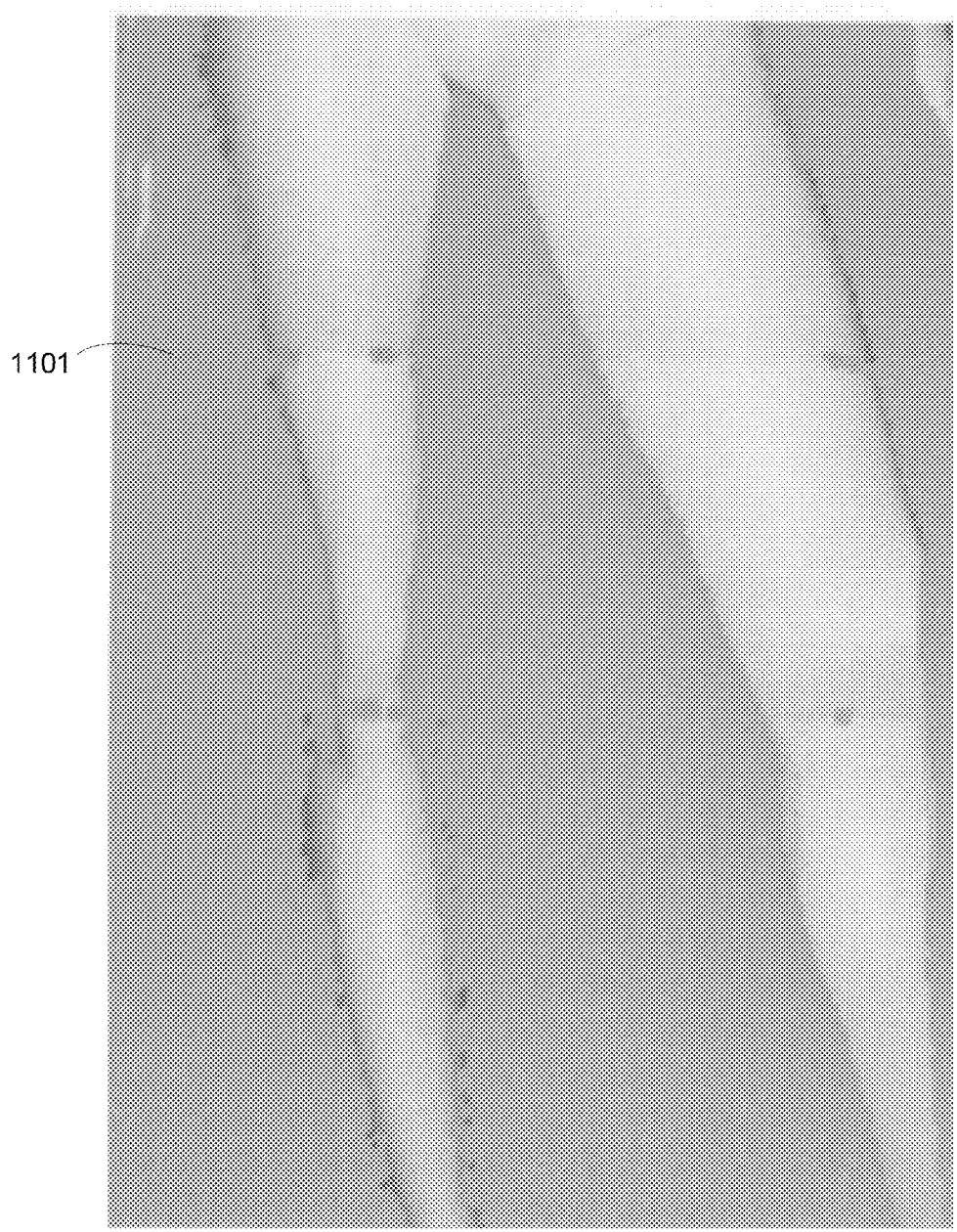
FIG. 11 shows a segmented image of three combined images of a scan of a person's legs.
Figure 12:
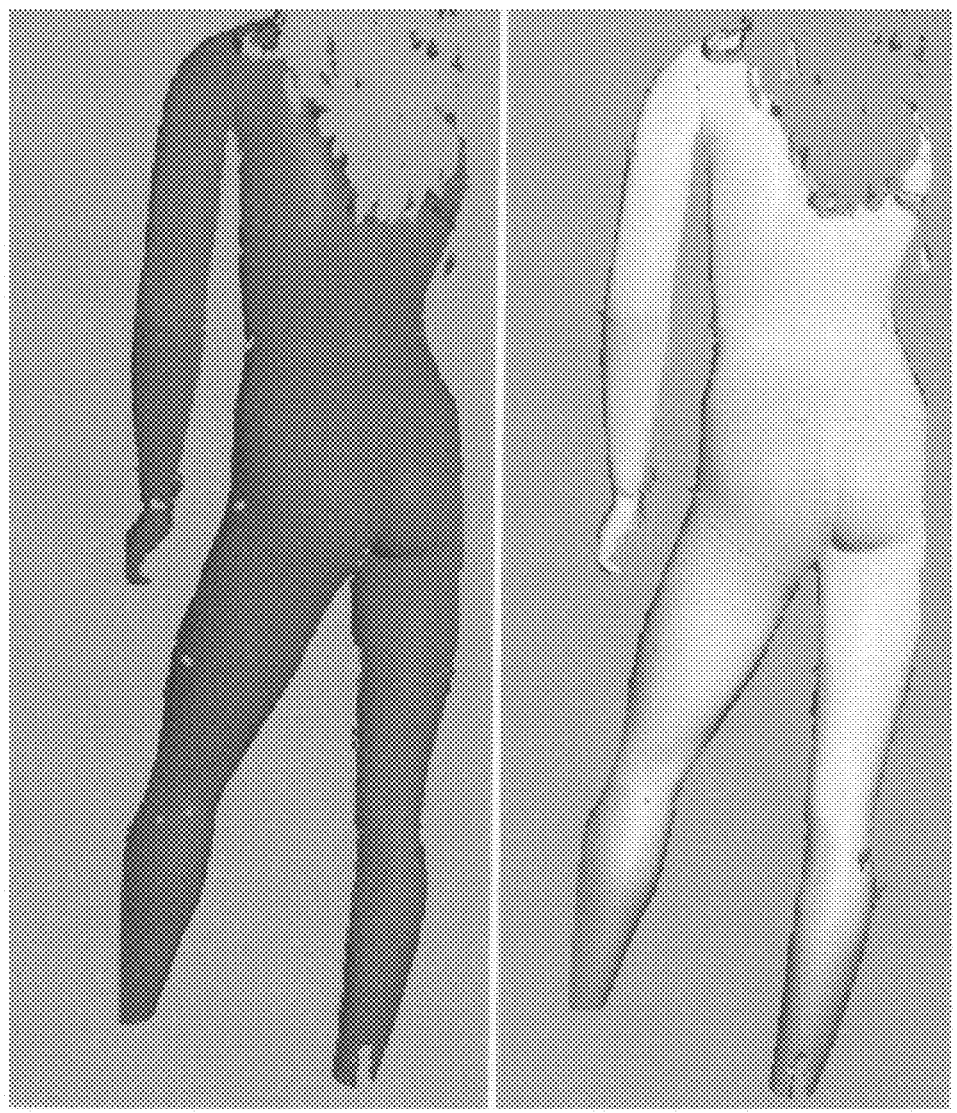
FIG. 12 shows a normalized brightness version of the body scan of FIG. 11 versus a brightened version of the normalized version wherein the segments of FIG. 11 are eliminated.

In addition, FIG. 11 shows a body scan image 1101 of a person. The scanner employed in this embodiment captures three images that are combined. The combined image 1101 is segmented at the knees and half way up the thighs due to the different light angles that occur through movement of the scanner to capture the three images. FIG. 12 shows brightness normalized 1201 and brightness multiplied up to an acceptable viewing level 1202.

With respect to FIG. 4, photometric atlas 403a shows no change from photometric atlas 403 although control points along chin 410 where morphed closer to the top of the head of person 401 as person 401 had gained a small amount of weight making the chin in the second scan slightly lower for example. Any method of morphing images from two separate scans of a body to more accurately overlay one another is in keeping with the spirit of the invention. Use of control points in the geometry mesh is but one possible method for matching control points and modifying the shape of a portion of a scan to more readily match another scan.

Figure 7:
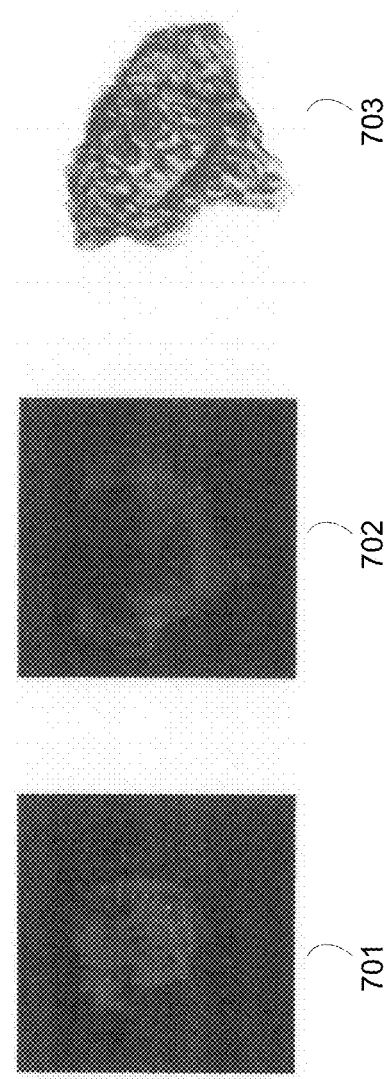
FIG. 7 shows three-dimensional views of a skin growth as displayed by an embodiment of the invention.

Surface geometric atlas 404*a* however shows lump on top portion of chin 410 that indicates a morphological change in either the surface or subsurface tissue or both, in person 401. A close-up of an area of interest in a difference of the two images is shown in FIG. 7, (i.e., the lump shown in 404*a*). Had a different type of morphological change occurred such as a color change of a mole, then the difference is shown on photometric atlas 403*a*. In yet another scenario with another type of morphological change that includes a growth that expands and changes in color, the morphological change is displayed in differences with respect to both photometric and surface geometric atlas views. A sample difference view between atlases may include only those elements unique to either atlas, or only those elements that have changed, from one atlas taken at one point in time to another atlas taken at another point in time. In other embodiments, a different color may be utilized or a flashing or artificial color may be utilized to indicate a difference on a particular atlas. Any method of showing a difference between one atlas and another taken at a different point in time is in keeping with the spirit of the invention.

Embodiments of the invention may also be utilized to detect morphological change rates, accelerations and any other derivative of change over time. This enables tissue areas that are changing faster than other areas or volumes to be highlighted, for example. In one scenario, a patient that has had skin cancer may be scanned every few months with moles that grow at a particular rate displayed in one color while moles that grow or accelerate growth at different rates or accelerations displayed in another color.

Figure 5:
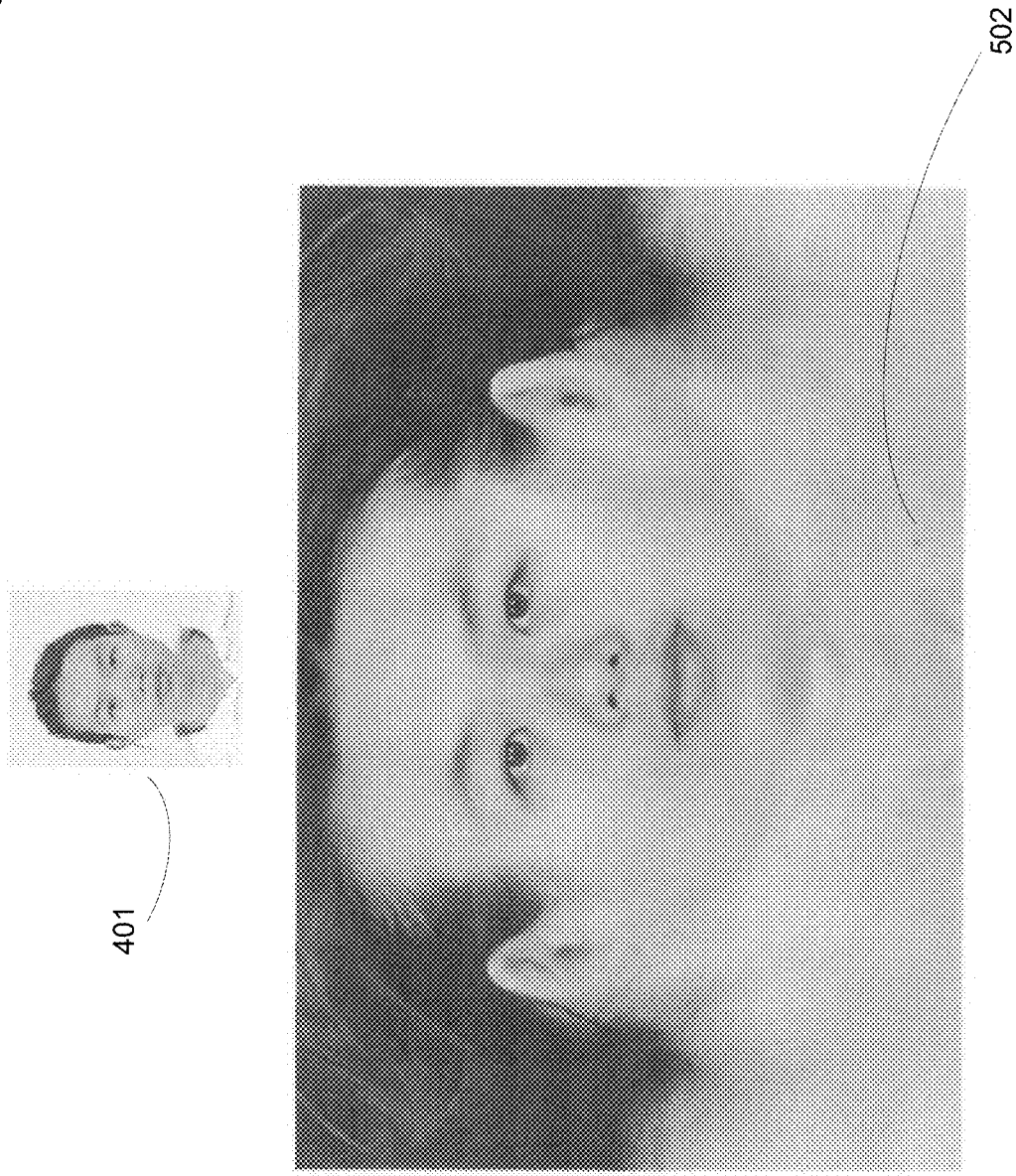
FIG. 5 shows a close up of the visual atlas view of the person in FIG. 4.

FIG. 5 shows a close up of the visual atlas view of person 401 of FIG. 4. Person 401 is shown with mole 502 that neither changes in shape or color and hence does not show up on any difference view.

Figure 6:
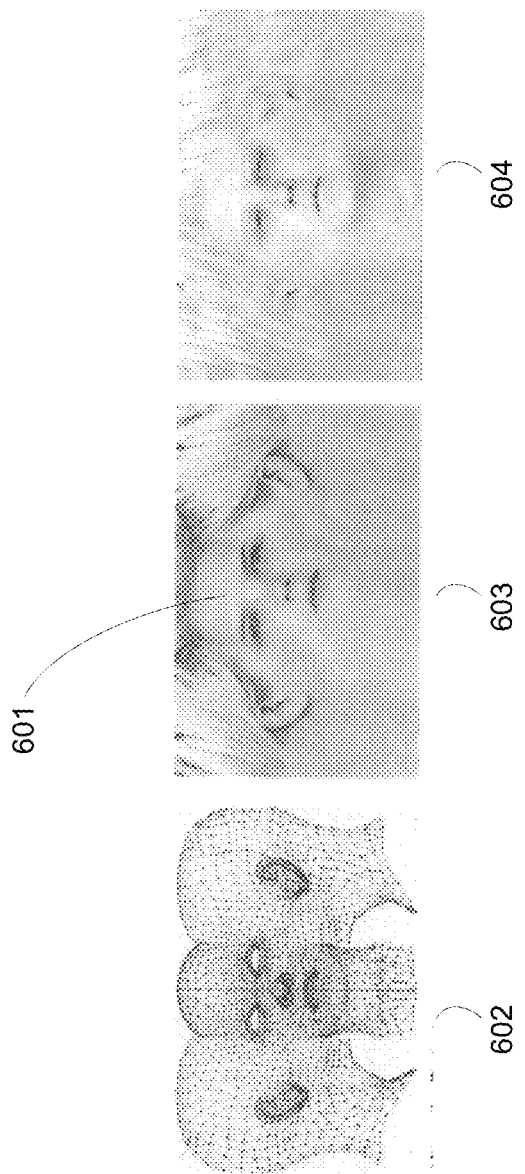
FIG. 6 shows a second person in atlas view using an alternate projection with respect to FIG. 4.

FIG. 6 shows second person 601 in atlas view using an alternate projection with respect to FIG. 4. In this view, an equirectangular projection is utilized to generate geometry mesh 602. A photograph of second person 601 is overlaid onto geometry mesh 602 to generate photometric atlas 603 while a grey-scale image is utilized to generate surface geometry atlas 604.

FIG. 7 shows three-dimensional views of a skin growth as displayed by an embodiment of the invention. Slice 701 shows a lower cross sectional slice while slice 702 shows an upper cross sectional slice.

By combining several slices such as slice 701 and 702 three-dimensional construction 703 of lump 410 may be generated. As shown, 24 slices make up the highly detailed image. As lump 410 was not present in the original office visit scans, more detailed clinical analysis may be performed with this early detected lump to determine if treatment is necessary.

Figure 13:
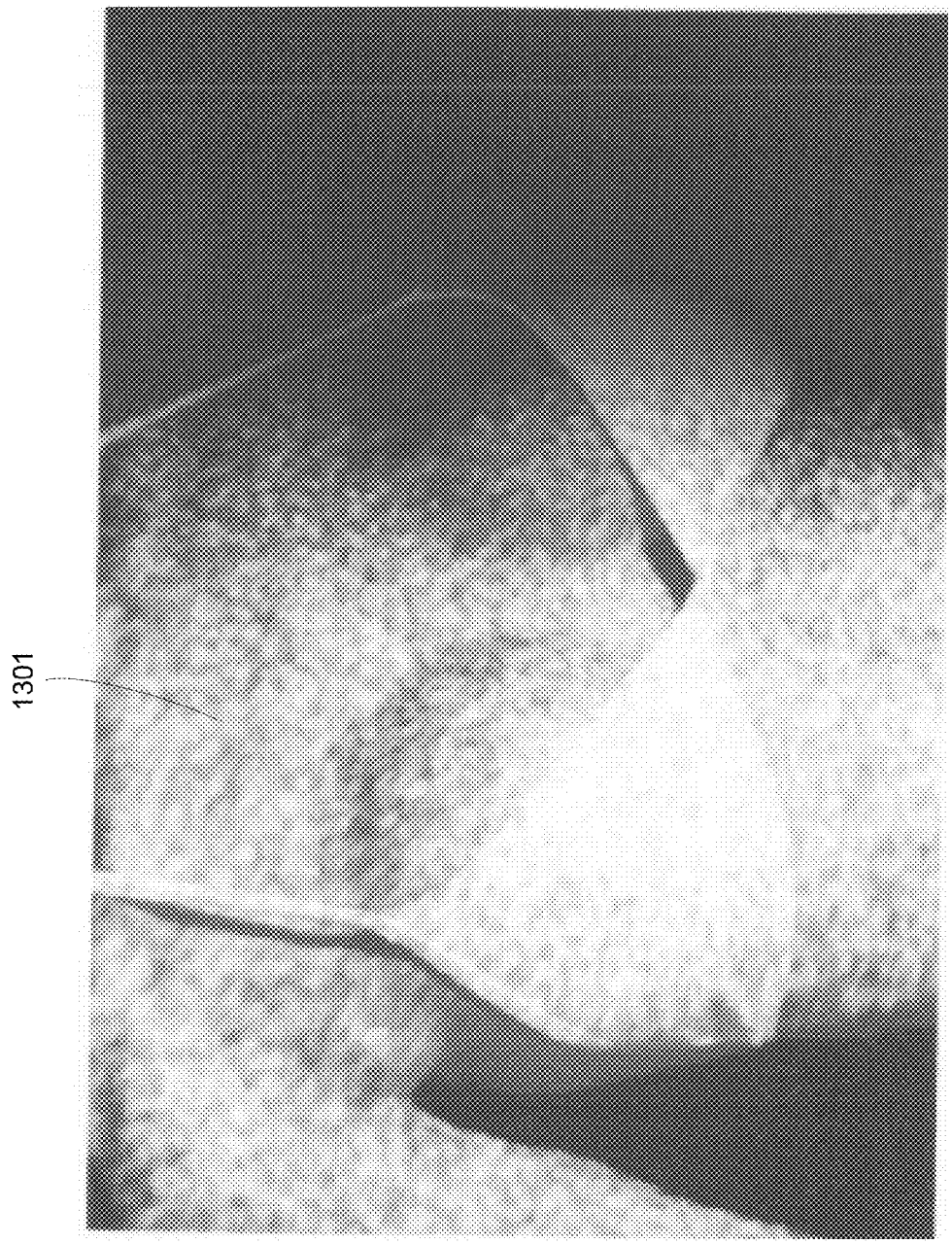
FIG. 13 shows light grid having two or more colors that is projected onto a person to enable rapid triangulation between two offset captured images to determine the depth of each color point on the body.

To detect surface morphological changes on a person, a light grid having two or more colors may be projected onto a person as shown in FIG. 13. In this figure, triangulation to a particular color point from two offset cameras allows for extremely rapid three-dimensional scanning by analyzing each of the two images and determining the angular difference between each known color point for example color point 1301, with respect to the two captured images. This method for example is far more rapid than scanning a laser across a person over a window of time.

Figure 8:
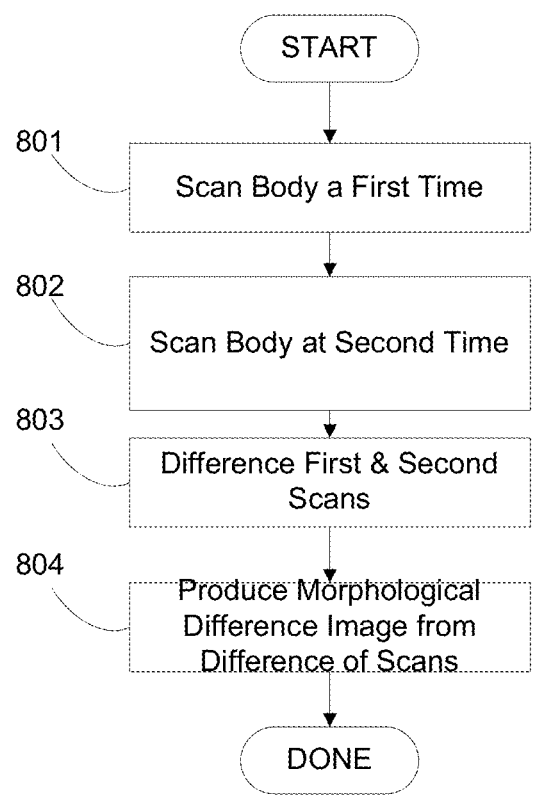
FIG. 8 illustrates a flow chart for an embodiment of the method.

FIG. 8 illustrates a flow chart for an embodiment of the method. A body (or portion thereof) is scanned at a first time at 801. The same body (or portion thereof) is scanned at a later time at 802. Any time interval may be utilized between the first and second scan based on what is attempting to be detected. For example, biological cell changes, days or months are typical time periods. The scans may be taken at different angles and stitched together using any type of projection as previously described above for example.

The two scans are differenced at 803 wherein any optional morph of the two scans to better align may also be performed. Since the person may have aged, gained or lost weight, the morph of one or more of the scans allows for less natural differences to be flagged. Any type of morph can be utilized to align two scans or atlases, for example by choosing control points such as corners of the eyes, nose, mouth and/or outline of any facial feature and stretching at least one of the scans to overlay with the other scan correctly, i.e., to minimize differences in locations of elements of each scan for example. A morphological difference image is produced at 804 and may be overlaid onto one or more scan images or skin atlases. Any highlighting of visual or geometric changes may also be performed in one or more embodiments of the method. In other embodiments of the invention or in combination with highlighting, only the differences, for example a mole that has gained mass whether on top of the skin or beneath the surface may be shown as the sole difference view. Any method of viewing differences that have occurred from one point in time to another are in keeping with the spirit of the invention.

Embodiments of the invention radically improve the detection of morphological changes in a body over time, regardless or in spite of the type of scanning technology utilized. While the invention herein disclosed has been described by means of specific embodiments and applications thereof, numerous modifications and variations could be made thereto by those skilled in the art without departing from the scope of the invention set forth in the claims.

What is claimed is:
1. A system for periodic body scan differencing for detecting changes in surface and subsurface body scans over time comprising
    a scanner configured to
        project a light pattern comprising a plurality of different colored points not forming colored lines onto a body at a first point in time;
        capture two images offset in distance from one another from two cameras at said first point in time;
        create a first scan having a first three-dimensional shape for said body at said first point in time through triangulation to a particular colored point in said plurality of different colored points in each of said two images;
        project said light pattern comprising said plurality of different colored points not forming colored lines onto said body at a second point in time;
        capture two images offset in distance from one another from two cameras at said second point in time;
        create a second scan having a second three-dimensional shape for said body at said second point in time through triangulation to said particular colored point in said plurality of different colored points in each of said two images;
    a computer configured to
        morph said first scan and said second scan to minimize differences;
        difference said first scan and said second scan;
        detect a morphological acceleration rate of change over time for said second scan relative to said first scan;
        highlight differences between acceleration rates of change for each of said first scan and said second scan using colors other than the scanned color to indicate changes between said first scan and said second scan in an atlas view; and, produce a morphological difference image from said differences and display said morphological difference image in said atlas view.

2. The system for periodic body scan differencing of claim 1 wherein said computer is further configured to morph said first scan or said second scan to account for age, weight or color differences in said portion of said body that have occurred between said first point in time and said second point in time.

3. The system for periodic body scan differencing of claim 1 wherein said computer is further configured to morph a geometry mesh associated with said first scan or said second scan to allow for said differencing to occur with minimal geometry differences.

4. The system for periodic body scan differencing of claim 1 wherein said computer is further configured to morph a photometric atlas associated with said first scan or said second scan to allow for said differencing to occur with minimal visual differences.

5. The system for periodic body scan differencing of claim 1 wherein said computer is further configured to display either said first scan or said second scan in said atlas view.

6. The system for periodic body scan differencing of claim 1 wherein said computer is further configured to display either said first scan or said second scan in said atlas view;

display said morphological difference image combined with either said first scan or said second scan in said atlas view.

7. The system for periodic body scan differencing of claim 1 wherein said computer is further configured to highlight a geometric change in said morphological difference image.

8. The system for periodic body scan differencing of claim 1 wherein said computer is further configured to highlight a visual change in said morphological difference image.

9. The system for periodic body scan differencing of claim 1 wherein said at least one detected different rates of change are each displayed using different colors.

10. A method for periodic body scan differencing for detecting changes in surface and subsurface body scans over time comprising:

projecting a light pattern comprising a plurality of different colored points not forming colored lines onto a body at a first point in time;

capturing two images offset in distance from one another from two cameras at said first point in time;

creating a first scan having a first three-dimensional shape for said body at said first point in time by triangulating to a particular colored point in said plurality of different colored points in each of said two images;

projecting said light pattern comprising said plurality of different colored points not forming colored lines onto said body at a second point in time;

capturing two images offset in distance from one another from two cameras at said second point in time;

creating a second scan having a second three-dimensional shape for said body at said second point in time; scanning a portion of a body at a first point in time to yield a first scan by triangulating to said particular colored point in said plurality of different colored points in each of said two images;

morphing said first scan and said second scan to minimize differences;

differencing said first scan and said second scan;

detecting a morphological acceleration rate of change over time for said second scan relative to said first scan;

highlighting at least one difference between acceleration rates of change in each of said first scan and said second scan using colors other than the scanned color to indicate changes between said first scan and said second scan in an atlas view; and, producing a morphological difference image from said differencing and display said morphological difference image in said atlas view.

11. The method for periodic body scan differencing of claim 10 further comprising:

morphing said first scan or said second scan to account for age, weight or color differences in said portion of said body that have occurred between said first point in time and said second point in time.

12. The method for periodic body scan differencing of claim 10 further comprising:

morphing a geometry mesh associated with said first scan or said second scan to allow for said differencing to occur with minimal geometry differences.

13. The method for periodic body scan differencing of claim 10 further comprising:

morphing a photometric atlas associated with said first scan or said second scan to allow for said differencing to occur with minimal visual differences.

14. The method for periodic body scan differencing of claim 10 further comprising:

displaying either said first scan or said second scan in said atlas view.

15. The method for periodic body scan differencing of claim 10 further comprising:

displaying either said first scan or said second scan in said atlas view;

displaying said morphological difference image combined with either said first scan or said second scan in said atlas view.

16. The method for periodic body scan differencing of claim 10 further comprising:

highlighting a geometric change in said morphological difference image.

17. The method for periodic body scan differencing of claim 10 further comprising:

highlighting a visual change in said morphological difference image.

18. The method for periodic body scan differencing of claim 10 wherein said at least one detected different rates of change are each displayed using different colors.

* * * * *